United States Patent
Ivie et al.

(10) Patent No.: US 10,881,091 B2
(45) Date of Patent: Jan. 5, 2021

(54) REEL DRAG MECHANISM

(71) Applicant: Pure Fishing, Inc., Spirit Lake, IA (US)

(72) Inventors: Cameron Ivie, Irmo, SC (US); Chandler Whisnant, Lexington, SC (US)

(73) Assignee: Pure Fishing, Inc., Spirit Lake, IA (US)

( * ) Notice: Subject to any disclaimer, the term of this patent is extended or adjusted under 35 U.S.C. 154(b) by 167 days.

(21) Appl. No.: 16/130,180

(22) Filed: Sep. 13, 2018

(65) Prior Publication Data

US 2019/0082668 A1 Mar. 21, 2019

Related U.S. Application Data

(60) Provisional application No. 62/560,352, filed on Sep. 19, 2017.

(51) Int. Cl.
*A01K 89/01* (2006.01)
*A01K 89/033* (2006.01)
(Continued)

(52) U.S. Cl.
CPC ........ *A01K 89/047* (2015.05); *A01K 89/0192* (2015.05); *A01K 89/027* (2013.01); *A01K 89/029* (2015.05); *A01K 89/056* (2015.05)

(58) Field of Classification Search
CPC .......... A01K 89/01121; A01K 89/0114; A01K 89/0117; A01K 89/0125; A01K 89/028
See application file for complete search history.

(56) References Cited

U.S. PATENT DOCUMENTS 2,858,087 A    10/1958   Giaimo et al.
4,416,427 A *  11/1983   Kawai ............... A01K 89/0117
                                                  242/244
(Continued)

FOREIGN PATENT DOCUMENTS

BE        901024 A     5/1985
EP        429923 B1    3/1996
(Continued)

OTHER PUBLICATIONS

European Search Report, dated Mar. 25, 2019.
(Continued)

*Primary Examiner* — Emmanuel M Marcelo
(74) *Attorney, Agent, or Firm* — Husch Blackwell LLP

(57) ABSTRACT

A drag assembly is provided for a spinning fishing reel. The drag assembly includes a collar engaged with a mainshaft of a reel. The collar is fixed to the mainshaft for rotational movement with the mainshaft, but is fixed with respect to a housing against longitudinal movement with the mainshaft. The mainshaft is thereby free to oscillate longitudinally through the collar. A brake mechanism is also provided for selective engagement with the collar. The brake mechanism includes a brake surface. The brake surface makes selective contact with the collar to create a selective frictional force against rotation of the collar, and thereby against rotation of the mainshaft. An adjustment mechanism is also engaged with the brake mechanism. The adjustment mechanism causes more or less force to be applied to the brake mechanism, creating greater or lesser frictional force between the brake surface and the collar.

20 Claims, 7 Drawing Sheets

(51) Int. Cl.
*A01K 89/015* (2006.01)
*A01K 89/027* (2006.01)

(56) References Cited

U.S. PATENT DOCUMENTS

| | | | |
|---|---|---|---|
| 4,428,544 A * | 1/1984 | Councilman | A01K 89/0114 242/242 |
| 4,491,285 A * | 1/1985 | Councilman | A01K 89/0114 242/242 |
| 4,813,626 A | 3/1989 | Sakumoto | |
| 4,830,307 A * | 5/1989 | Lassi | A01K 89/027 242/245 |
| 5,120,001 A | 6/1992 | Kaneko | |
| 5,511,735 A | 4/1996 | Kaneko | |
| 5,816,516 A | 10/1998 | Yamaguchi | |
| 5,865,386 A | 2/1999 | Tao | |
| 2002/0056776 A1 * | 5/2002 | Sugawara | A01K 89/0108 242/231 |
| 2002/0130209 A1 * | 9/2002 | Noda | A01K 89/0114 242/279 |
| 2005/0274838 A1 * | 12/2005 | Sugahara | A01K 89/01 242/306 |
| 2010/0308148 A1 * | 12/2010 | Ng | A01K 89/03 242/243 |
| 2015/0090821 A1 * | 4/2015 | Takamatsu | A01K 89/02 242/243 |

FOREIGN PATENT DOCUMENTS

| | | |
|---|---|---|
| EP | 649595 B1 | 1/1998 |
| EP | 0985343 A1 | 3/2000 |
| JP | 2016082902 A | 5/2016 |

OTHER PUBLICATIONS

DAM Quick SLS—https://www.amazon.com/DAM-Quick-SLS-570-Baitrunner/dp/B00032KV32, as early as Jun. 2017.
Daiwa Infinity X—http://www.daiwa-cormoran.info/dw/en/products_1/bite_n_run_reels/infinity_x_br/5,1,77,75,1,1_products-model.htm?ovs_prdrows2=10&ovs_search0=infinity%20x&sid=xljlbeupewy&stamp=1499112193, as early as Jun. 2017.

* cited by examiner

REEL DRAG MECHANISM

CROSS-REFERENCE TO RELATED APPLICATIONS

This application claims priority to U.S. Provisional Application Ser. No. 62/560,352 filed on Sep. 19, 2017.

FIELD OF THE INVENTION

The present invention relates, generally, to the field of fishing reels. More particularly, the present invention relates to a spinning reel drag mechanism.

BACKGROUND OF THE INVENTION

The main drag mechanism of a spinning fishing reel regulates drag force against rotation of a spool. In most reels, when the main drag mechanism is engaged, the spool is locked from freely spinning. Only when the force applied to the fishing line is sufficient to overcome the friction of main drag does the spool spin. By allowing the spool to let out line at high enough forces, the main drag helps prevent the fishing line from breaking.

The frictional force necessary to overcome the main drag mechanism can, in many modern reels, be adjusted by the user to increase or decrease the drag force. However, such adjustment is generally performed in advance of fishing. Once fishing has commenced, adjusting the main drag mechanism is usually limited to small adjustments to fine tune for a specific application. Some reels utilize a rear drag to provide accessibility of the drag adjustment closer to the anglers body. For applications requiring routine adjustments between two distinctly different drag settings, a simple on/off switch is typically provided to quickly toggle between the main drag and a secondary drag.

However, existing reels with rear drag mechanisms, either as the main drag or as a secondary drag, generally have very long reel bodies. Positioning the drag behind the oscillate system forces the drag mechanism to be longer than the length of the oscillation to ensure the mainshaft remains engaged in the drag mechanism. Some prior art reels have attempted to reduce the reel body size by applying frictional force on an axis other than on the axis of the mainshaft and spool. However, this results in reel bodies with more complexity, more parts, and an overall wider size.

SUMMARY OF THE INVENTION

In accordance with embodiments of the present disclosure, disclosed herein is a drag assembly. In an embodiment, the drag assembly includes a collar engaged with a mainshaft of a reel. The collar is fixed to the mainshaft for rotational movement with the mainshaft, but is fixed with respect to a housing against longitudinal movement with the mainshaft. The mainshaft is thereby free to oscillate longitudinally through the collar. A brake mechanism is also provided for selective engagement with the collar. The brake mechanism includes a brake plate having a brake surface. The brake surface makes selective contact with the collar to create a selective frictional force against rotation of the collar, and thereby against rotation of the mainshaft. An adjustment mechanism is also engaged with the brake mechanism. The adjustment mechanism causes more or less force to be applied to the brake mechanism, creating greater or lesser frictional force between the brake surface and the collar. The adjustment mechanism can cause more or less force to be applied to the collar in either a direction perpendicular to the axis of the collar and mainshaft, or in a direction parallel to the axis of the collar and the mainshaft.

DETAILED DESCRIPTION

Figure 1:
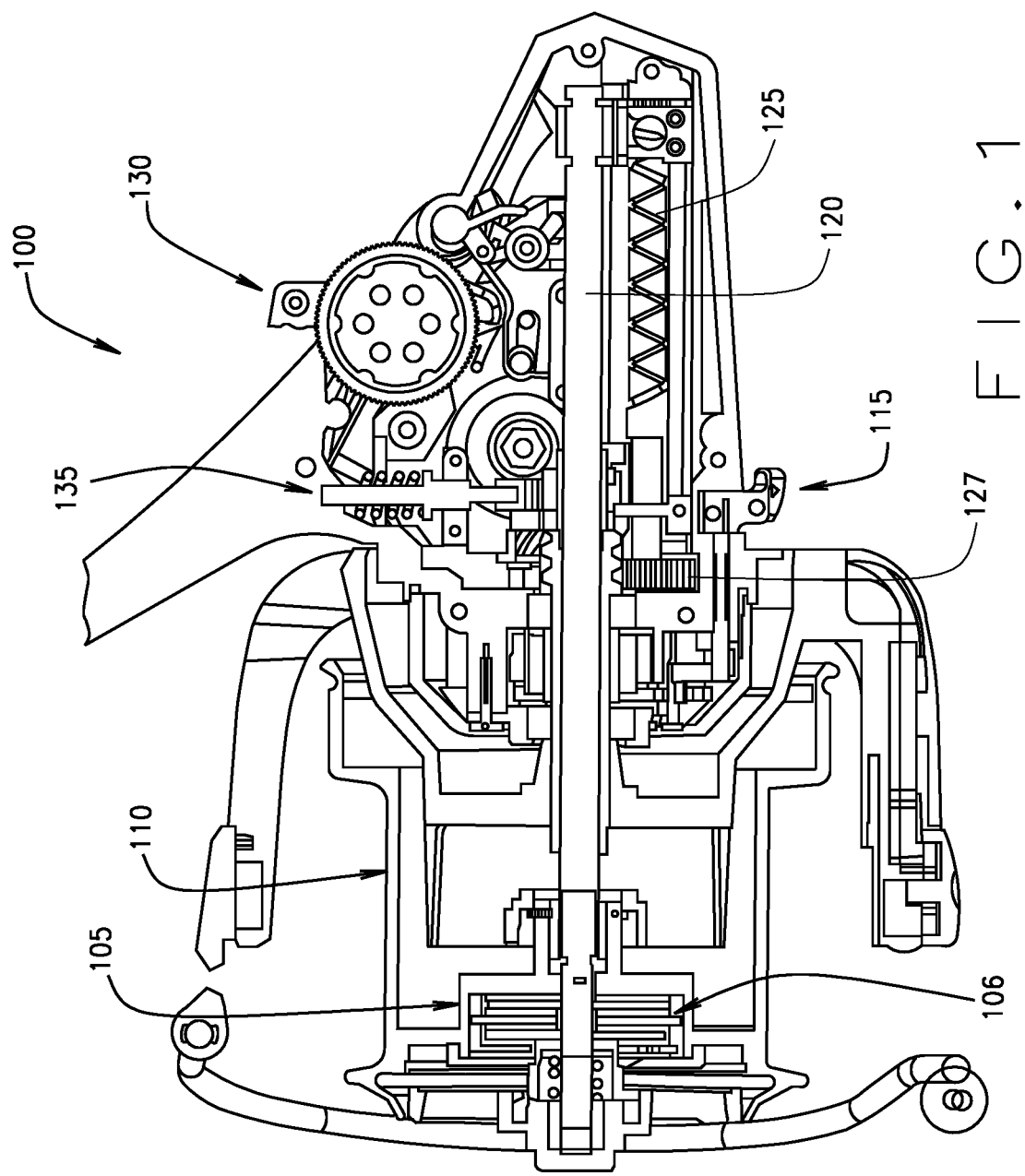
FIG. 1 is an elevational cross-sectional view of an assembled reel with main drag and secondary drag assemblies constructed in accordance with the teachings of one embodiment of the present invention.

FIG. 1 shows a cross-section of a fishing reel 100 in accordance with embodiments of the present disclosure. In the embodiment shown, the main drag 105 is positioned at the front of the reel 100. As illustrated, main drag assembly 105 is formed by a set of washers 106, although other possible main drag structures would be appreciated to a person of ordinary skill in the art. Some of the washers 106 are keyed to the mainshaft 120 and some are keyed to the spool 110. Friction between the washers 106 create a frictional force against rotation of the mainshaft 120. A user can generally pre-set the amount of main drag force manually using means generally known in the art.

The spool 110 for holding fishing line is positioned generally rearward of the main drag assembly 105, but in front of the main housing 115. The mainshaft 120 extends from the main drag assembly 105, through the spool 110, and into the main housing 115. The spool 110 is rotated by the mainshaft 120. An oscillate mechanism 125 works with the mainshaft 120 as would be known in the art.

Figure 2:
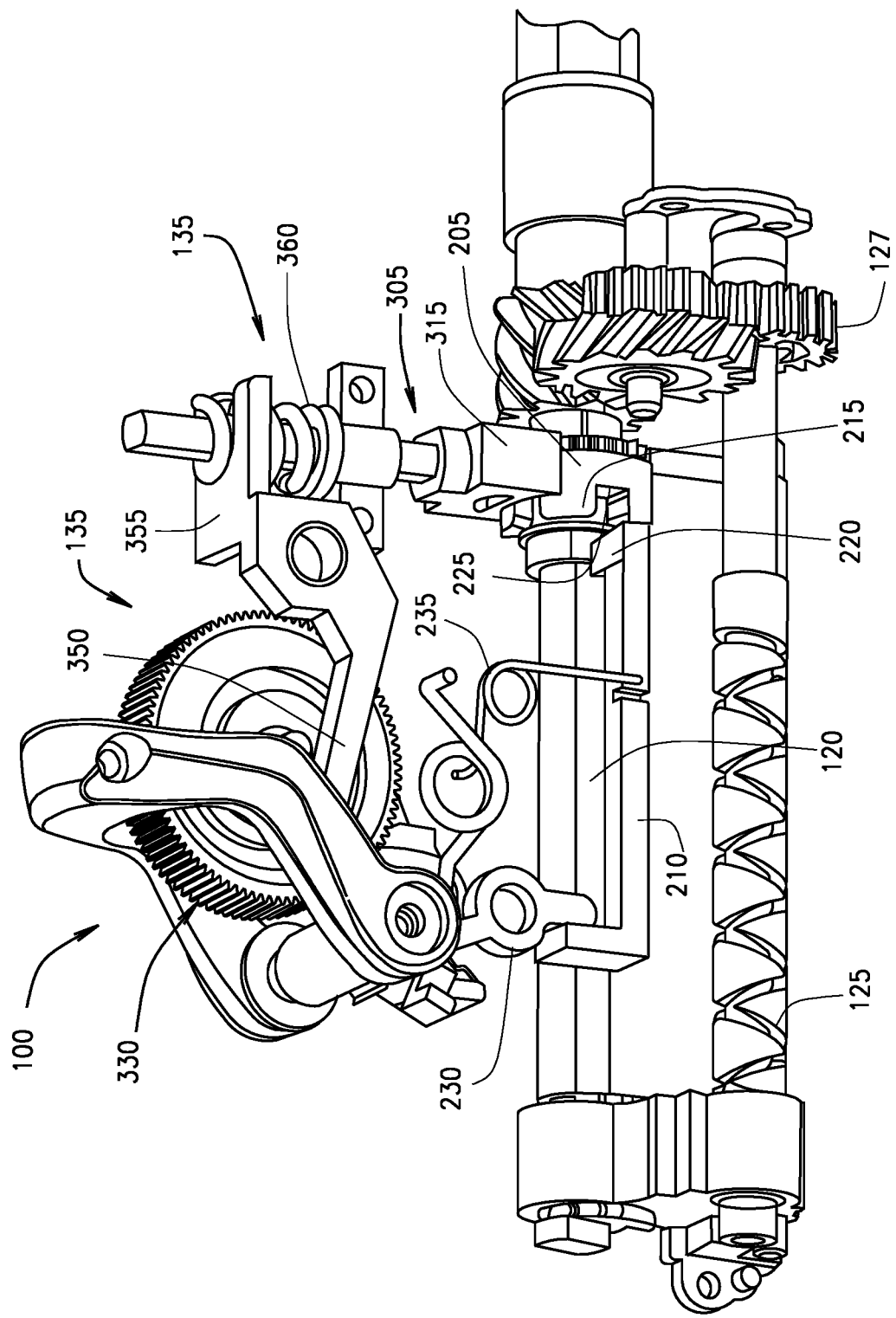
FIG. 2 is a perspective view of the secondary drag assembly of FIG. 1, with other elements of the reel removed, in which the main drag assembly is engaged.
Figure 3:
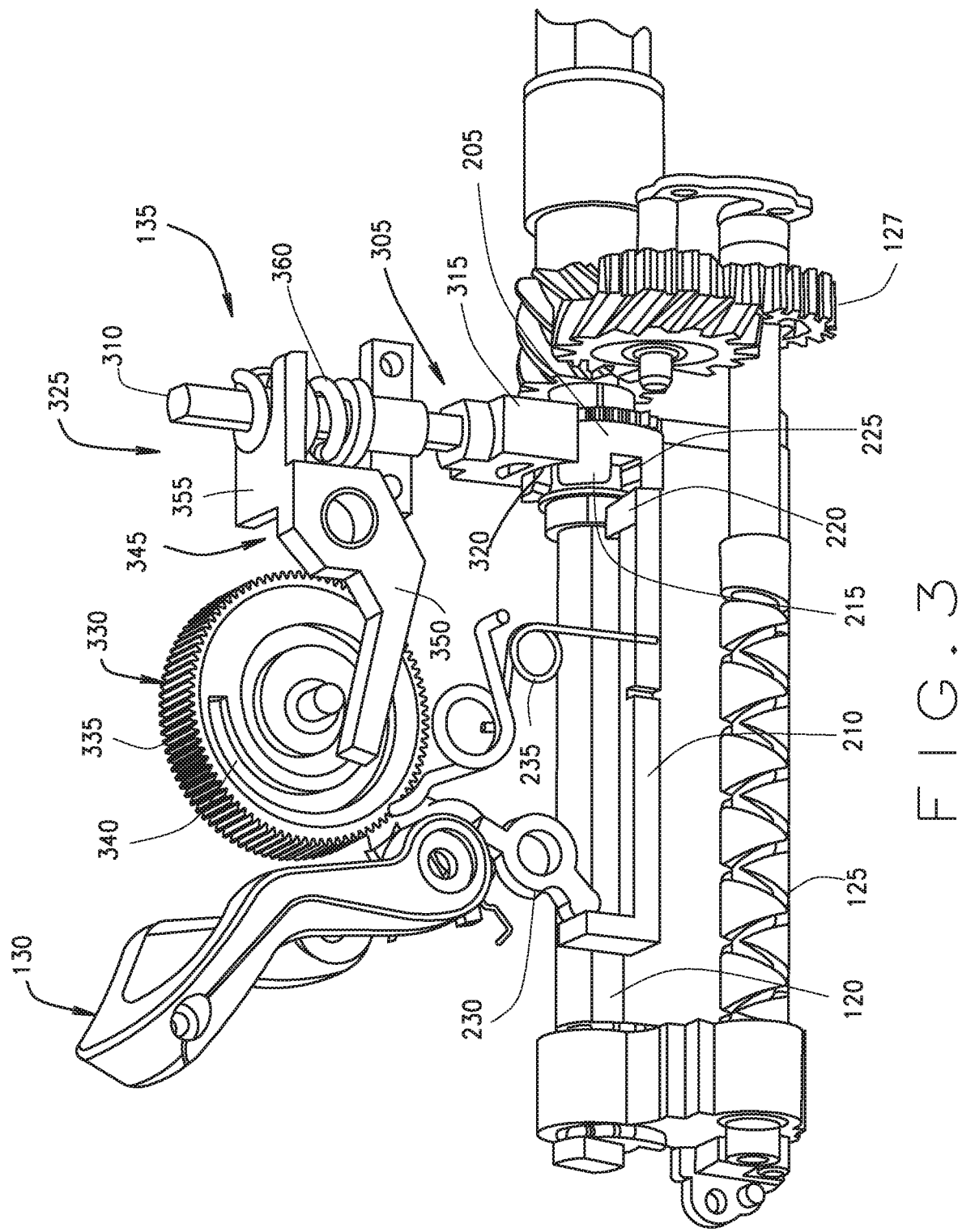
FIG. 3 is a perspective view of the secondary drag assembly of FIG. 2, in which the main drag assembly is disengaged and the secondary drag assembly is engaged at a higher setting.

When the main drag 105 assembly is engaged as will be hereinafter discussed in detail below, the mainshaft 120 is locked against rotation. Rotation of the spool 110 can therefore only occur when a force is applied to the line that is sufficient to overcome the friction between the washers 106 of the main drag assembly 105. Such structure is generally known in the art. A user may engage the main drag assembly 105 using the main drag lever 130 as best shown in FIGS. 2 and 3. The main drag lever 130 is discussed below in greater detail in connection with portions of the secondary drag assembly 135.

As can be seen in FIGS. 2 and 3, the secondary drag assembly 135 includes a collar 205 positioned at least partially around the mainshaft 120. The functionality of the collar 205 as it relates to the secondary drag assembly 135 will be discussed below. However, collar 205 also functions in connection with the main drag lever 130 to engage and disengage the main drag 105. In an example embodiment, the collar 205 is supported by the housing 115. This allows the mainshaft 120 to oscillate through the collar 205, such that the mainshaft 120 is not bound to the collar 205 for axial movement of the mainshaft 120. However, the collar 205 is rotationally coupled to the mainshaft 120, such that the collar 205 rotates along with the mainshaft 120 about the longitudinal axis of the mainshaft 120.

Figure 4:
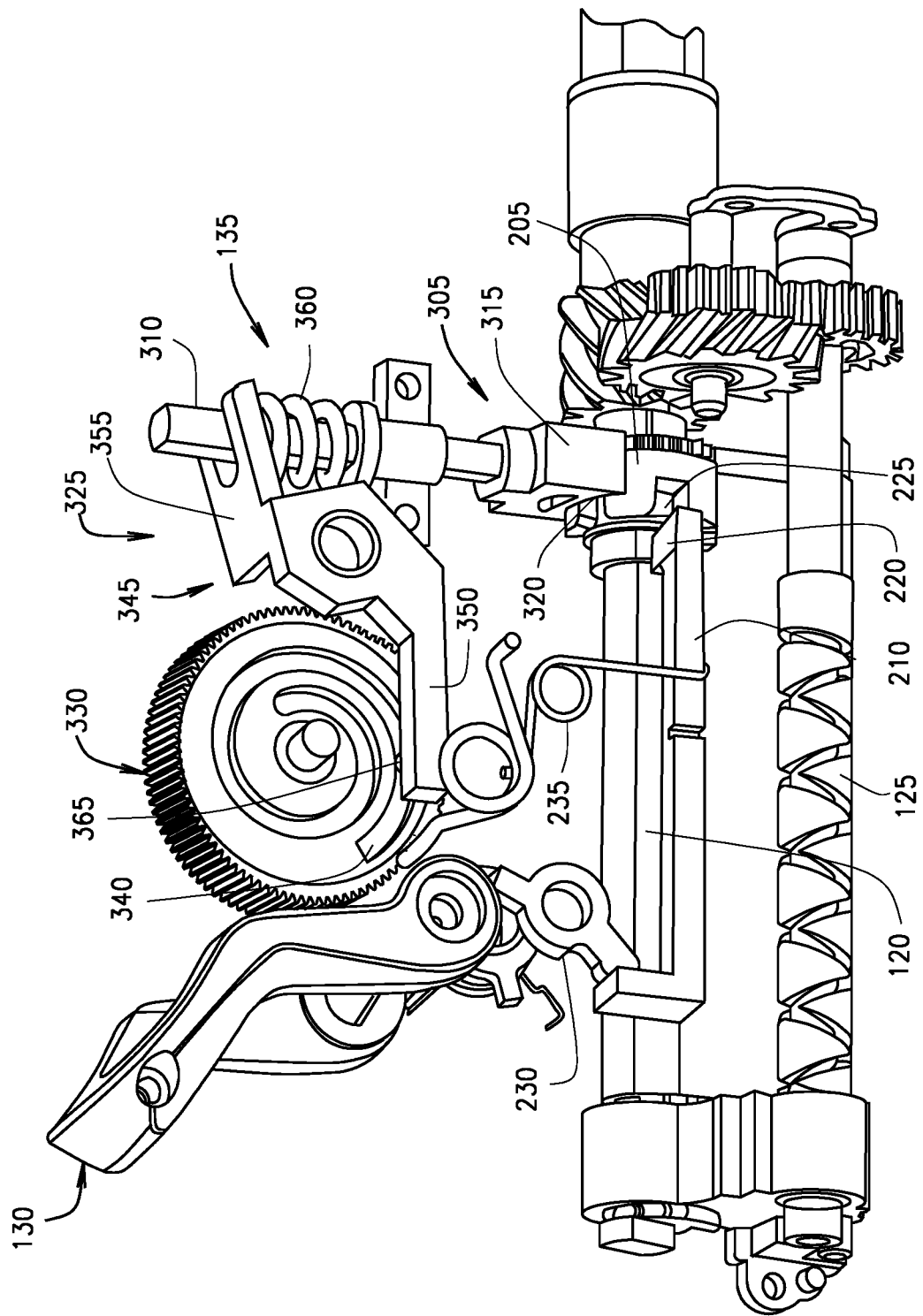
FIG. 4 is a perspective view of the secondary drag assembly of FIG. 2, in which the main drag assembly is disengaged and the secondary drag assembly is set to its lowest setting.

A latch 210 is provided for engagement of the main drag 105. Latch 210 can selectively engage with collar 205 via one or more teeth 215 provided on collar 205 as best shown in FIGS. 3 and 4. When main drag lever 130 is in a first position, as shown in FIG. 2, the latch 210 is also in its first position. In the first position, a flange 220 extending from latch 210 as best shown in FIGS. 3 and 4 engages with a recess 225 between adjacent teeth 215 on collar 205. In this position, the collar 205 is prevented from rotating by latch 210, thereby preventing the mainshaft 120 from rotating. Engagement of the latch 210 and the collar 205 thereby engages the main drag 105, which becomes the only way for the spool 110 to rotate.

However, in FIG. 3, main drag lever 130 has been moved to a second position, which causes the latch 210 to move into its second position and out of engagement with the collar 205. In the second position, the flange 220 of latch 210 no longer meshes in the recess 225 between teeth 215 of collar 205. Disengagement of the latch 210 from the collar 205 disengages the main drag 105 by allowing collar 205 and mainshaft 120 to rotate freely and allows a user to control rotation of the mainshaft 120 through the secondary drag assembly 135 as will be hereinafter explained.

As shown in FIGS. 2 and 3, movement of the main drag lever 130 acts on latch 210 via one or more levers 230. However, other structures as would be known in the art, such as gearing or the like, may be used to actuate latch 210. Further, as shown in FIGS. 2 and 3, latch 210 may be biased toward its first position by a biasing spring 235 or some other biasing structure. With a biasing spring 235 in place, the main drag lever 130 (or any associated linkages) may act on the latch 210 in only a single direction (e.g., toward the second position). The biasing spring 235 will act on the latch 210 to move it to the first position when the main drag lever 130 does not force the latch 210 to the second position. However, it will be understood that a biasing spring 235 or some other biasing mechanism may bias the latch toward the second position, while the main drag lever 130 acts on the latch 210 toward the first position. In yet another alternative, there may be no biasing mechanism at all, and the main drag lever 130 may work with linkages that actively move the lever 210 between its first and second positions.

FIGS. 3 and 4 illustrate the operation of the secondary drag assembly 135. Secondary drag assembly 135 includes a plunger 305 that includes a rod 310 extending from a brake 315. Brake 315 includes a brake surface 320 that is preferably sized and shaped to engage with collar 205. As shown, collar 205 is generally circular, and the brake surface 320 is therefore concave to engage with the outer diameter of collar 205.

In FIG. 3, the main drag assembly 105 has been disengaged by moving the main drag lever 130 to its second position. The latch 210 and its associated flange 220 is therefore free from the teeth 215 of collar 205, and the collar 205 (and thereby the mainshaft 120) is free to rotate. However, FIG. 3 also illustrates that the plunger 305 is biased toward collar 205 such that the brake surface 320 of brake 315 is in contact with the collar 205. In this position, the brake 315 exerts a frictional force on the collar 205, thereby making rotation of the collar 205 and mainshaft 120 more difficult. The force applied to the outer diameter of collar 205 is not transferred to the mainshaft 120, which is still able to oscillate therethrough. However, the plunger 305 acts as a secondary drag. As will be understood, the amount of force exerted by the brake 315 on the collar 205 determines the amount of drag that will be felt on the fishing line.

In an example embodiment, the force of the brake 315 on the collar 205 may be adjustable. FIGS. 3 and 4 illustrate an adjustment mechanism 325 as part of the secondary drag assembly 135. Adjustment mechanism 325 may include a drag wheel 330 that includes a textured outer surface 335. The textured outer surface 335 may assist a user in turning the drag wheel in wet conditions. It will be understood that the textured outer surface 335 may have any texturing, or no texturing at all. The textured outer surface 335 may be formed from a rubber material, or another material with beneficial gripping characteristics, or from any other material. It is also noted that any adjustment structure may be used in place of wheel 330, such as a lever, knob, or the like. Alternatively, a simple on/off toggle switch could also be used if adjustability is not desired.

As illustrated in FIGS. 3 and 4, wheel 330 includes a spiral-shaped linear cam track 340 on at least one side of the wheel 330. A lever component 345 includes a follower arm 350 that follows the linear cam track 340 as would be understood in the art. In an example embodiment, the follower arm 350 may include a follower pin 365 or the like (visible only in FIG. 4, discussed below) which projects from follower arm 350 and extends into the linear cam track 340. The follower arm 350 of lever component 345 thereby pivots or rotates to follow the track of the linear cam track 340 as the wheel 330 is rotated. Extending opposite the follower arm 350 on the lever component 345 is a spring arm 355, which pivots opposite the follower arm 350 as the wheel 330 is turned.

The spring aim 355 engages with a spring 360 or other biasing mechanism associated with the rod 310 of the plunger 305. As the spring arm 355 pivots to push more forcefully on spring 360, the brake 315 is in turned pressed against the collar 205 more forcefully. This increases the drag force even when the main drag assembly 105 is disengaged. As can be seen in FIG. 3, the wheel 330 has been rotated such that the follower arm 350 is near its highest position near one end of the linear cam track 340. Thus, the opposing spring arm 355 is near its lowest position, and is exerting a relatively high amount of force on the plunger 305 which, in turn, exerts a relatively high amount of force on the collar 205.

However, in FIG. 4, the wheel 330 has been counter-rotated such that follower pin 365 is visible near the opposite end of the linear cam track 340. The follower arm 350 is therefore near its lowest position, causing the spring arm 355 to raise to nearly its highest position. The plunger 305 is therefore being forced against the collar 205 with very little force, if any force at all. Thus, the adjustment mechanism 325 of the secondary drag assembly 135 allows for selectable drag force independent of the main drag assembly 105 and allows a user to adjust the secondary drag force on the fly while a user is battling and/or reeling in a fish on the line. A user can rotate drag wheel 330 to increase or decrease the secondary drag force while fishing. Use of the main drag lever 130 therefore allows a user to determine which drag force will control rotation of the mainshaft 120. This selectable secondary force is applied between the pinion 127 and the oscillation mechanism 125, normal to collar 205 and mainshaft 120. Also, when the latch 210 is in its second position, the user can control rotation of the mainshaft 120 solely through use of drag wheel 330 and the secondary drag assembly 135.

By positioning the collar 205 and plunger 305 in front of the oscillation mechanism 125, the housing 115 and thereby the reel 100 can also be made smaller than prior art reels, which positions the secondary drag assembly 135 behind the oscillation mechanism.

Although adjustment mechanism 325 was discussed in terms of specific hardware components above, it will be understood that other mechanisms for varying force applied to the collar 205 by the plunger 305 could be used. As a non-limiting example, gearing could be used instead of lever component 345. Similarly, a biasing mechanism (such as spring 360) may be omitted where additional structure is used to effectuate movement of the plunger 305.

Figure 5:
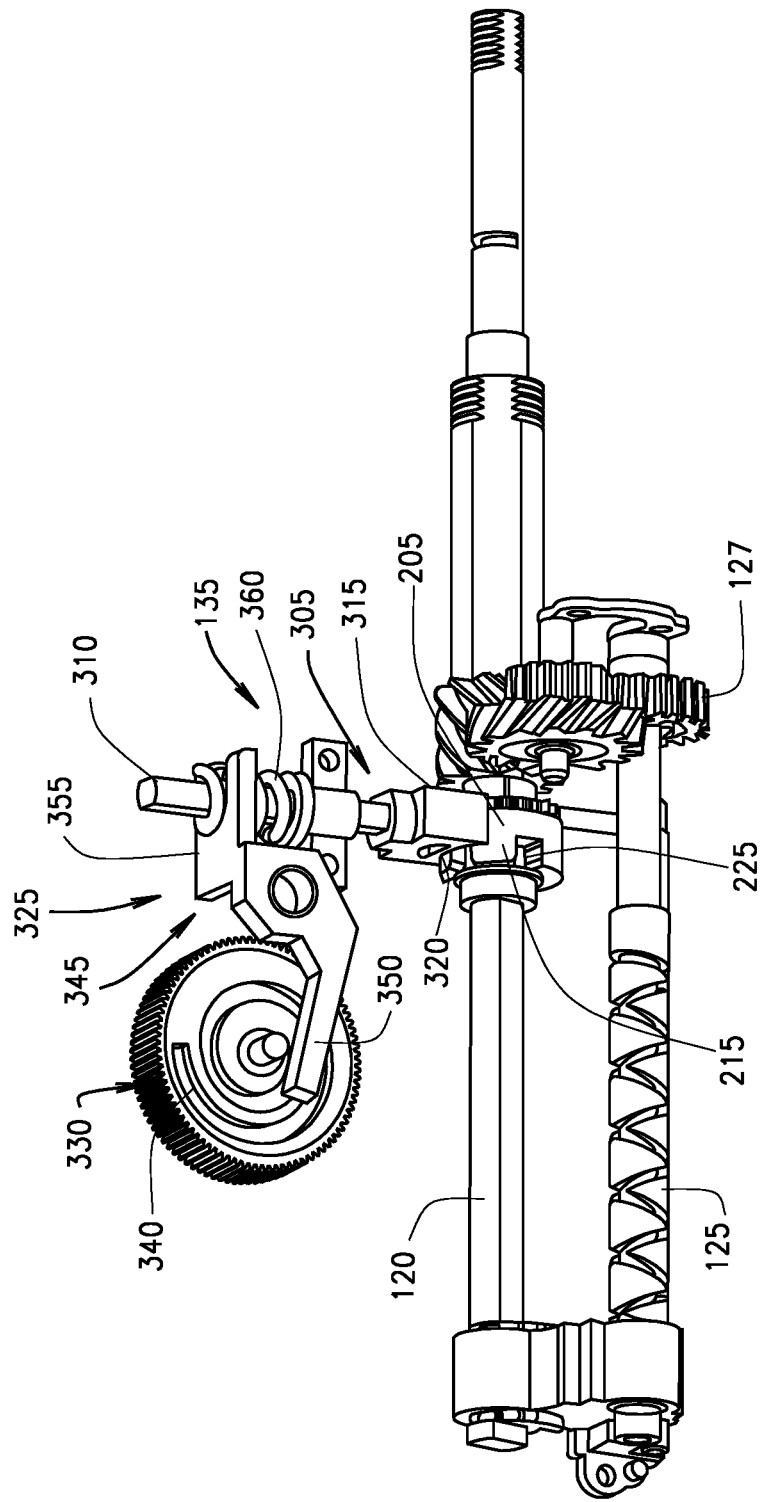
FIG. 5 is a perspective view of still another embodiment of the present invention where the main drag assembly is removed and the drag force applied to the mainshaft is controlled solely by the secondary drag assembly.

Secondary drag assembly 135 may be used in connection with main drag assembly 105, as shown in FIG. 2. However, main drag assembly 105 could be omitted completely, such that the secondary drag assembly 135 is actually the sole drag assembly for the reel. This embodiment is illustrated in FIG. 5 where the main drag assembly 105, the main drag lever 130, the latch 210 and the associated linkage 230 and biasing structure 235 have been eliminated. As illustrated in FIG. 5, only the secondary drag assembly 135 is used to apply a greater or lesser fractional force to the mainshaft 120. In all other respects, the secondary drag assembly 135 is identical to the structure previously explained with respect to FIGS. 3 and 4, including adjustment mechanism 325 and its associated structure.

Figure 6:
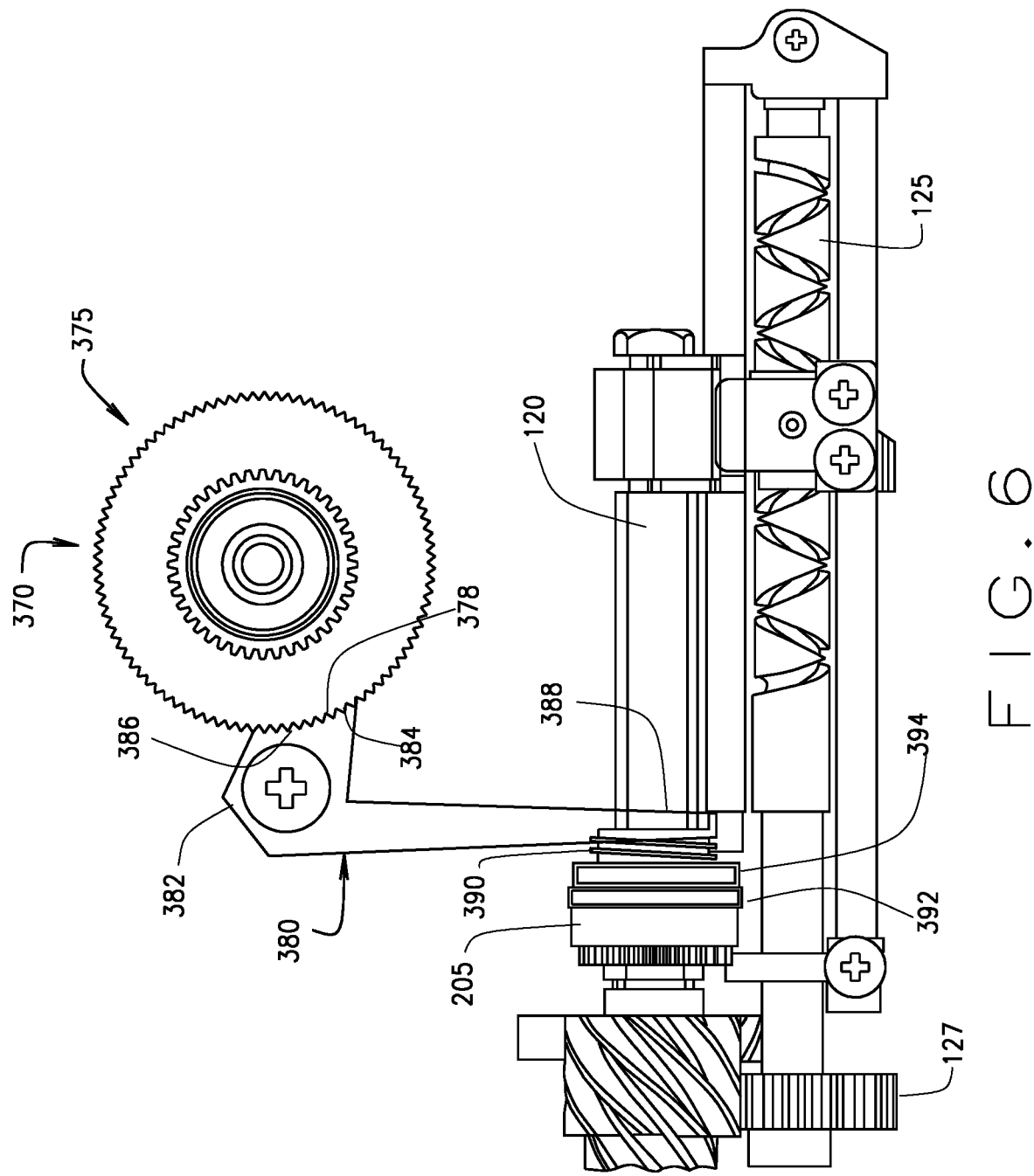
FIG. 6 is a partial side elevational view of another embodiment of the present invention where an adjustable axial drag force is applied in a direction parallel to the longitudinal axis of the mainshaft of the reel.

It is also noted that the drag force applied to the collar 205 could be in a direction parallel to the longitudinal axis of the mainshaft 120. For example, as illustrated in FIG. 6, an axial adjustment system 370 includes drag wheel 375 having a plurality of teeth 378 associated therewith which is coupled to a lever member 380 as will be hereinafter further explained. Lever member 380 includes an upper portion 382 having an arcuate face 384 associated therewith, the arcuate face 384 including a plurality of teeth 386 which are configured to mesh with the plurality of teeth 378 associated with drag wheel 375. The opposite end portion 388 of lever member 380 is positioned around or adjacent to the mainshaft 120 associated with the fishing reel 100 and is likewise positioned and located in an abutting relationship with a biasing means 390 which is likewise positioned adjacent to or surrounding mainshaft 120. Biasing member 390 can be any suitable spring member such as a Belleville spring well-known in the art. A pair of washer members 392 and 394 which are likewise well-known in the art are positioned and located between the biasing member 390 and the collar 205. As the lever member 380 moves axially towards and away from collar member 205, as will be hereinafter explained, the biasing means 390 engages the washers 392 and 394 and can provide a progressively increasing or decreasing force against collar member 205 thereby progressively adjusting the amount of force applied to the collar 205. It is recognized and anticipated that any plurality of washers can be utilized between the collar 205 and the biasing member 390 including a single washer.

In this particular embodiment, the brake mechanism for exerting a frictional force on the collar 205 includes the pair of washer members 392 and 394 and the brake surface previously referred to above can be washer member 392 or both washers 392 and 394. Here again, the force applied to the outer surface of collar 205 by the washers 392 and 394 makes rotation of the collar 205 and therefore rotation of the mainshaft 120 more difficult. As previously explained, the amount of force exerted by the washers 392 and 394 onto the collar 205 determines the amount of the drag force that will be felt on the fishing line.

Adjustment of the frictional force applied to collar 205 is controlled by rotation of the drag wheel 375. As the drag wheel 375 is rotated in a counter-clockwise direction, engagement of the drag wheel with the upper portion 382 of lever member 380 moves lever member 380 towards the collar 205. This movement compresses the biasing member 390 and increases the frictional force between washer members 392 and 394 thereby increasing the frictional force on collar member 205. As the drag wheel 375 is rotated in a clockwise direction, the lever member 380 is moved away from collar member 205, thereby decreasing the frictional force applied to collar member 205. As such, a user can easily control the amount of drag force applied to the mainshaft 120 by simply rotating the drag wheel 375.

Although FIG. 6 illustrates the axial adjustment mechanism 370 separate and apart from use with a main drag assembly, such as main drag assembly 105, and depicts the adjustment mechanism 170 as the sole drag assembly for a particular reel, it is recognized and anticipated that the adjustment mechanism 370 can likewise be used in conjunction with the main drag assembly 105 as shown in FIG. 2 and that the adjustment mechanism 370 can be used in conjunction with the main drag lever 130, the latch 210 and its associated linkage 230, and biasing structure 235, as previously explained. This again gives the user the opportunity to switch from the main drag force being applied to the fishing line to an adjustable secondary drag force which is applied axially to collar 205 in a direction parallel to the longitudinal axis in the mainshaft 120.

Figure 7:
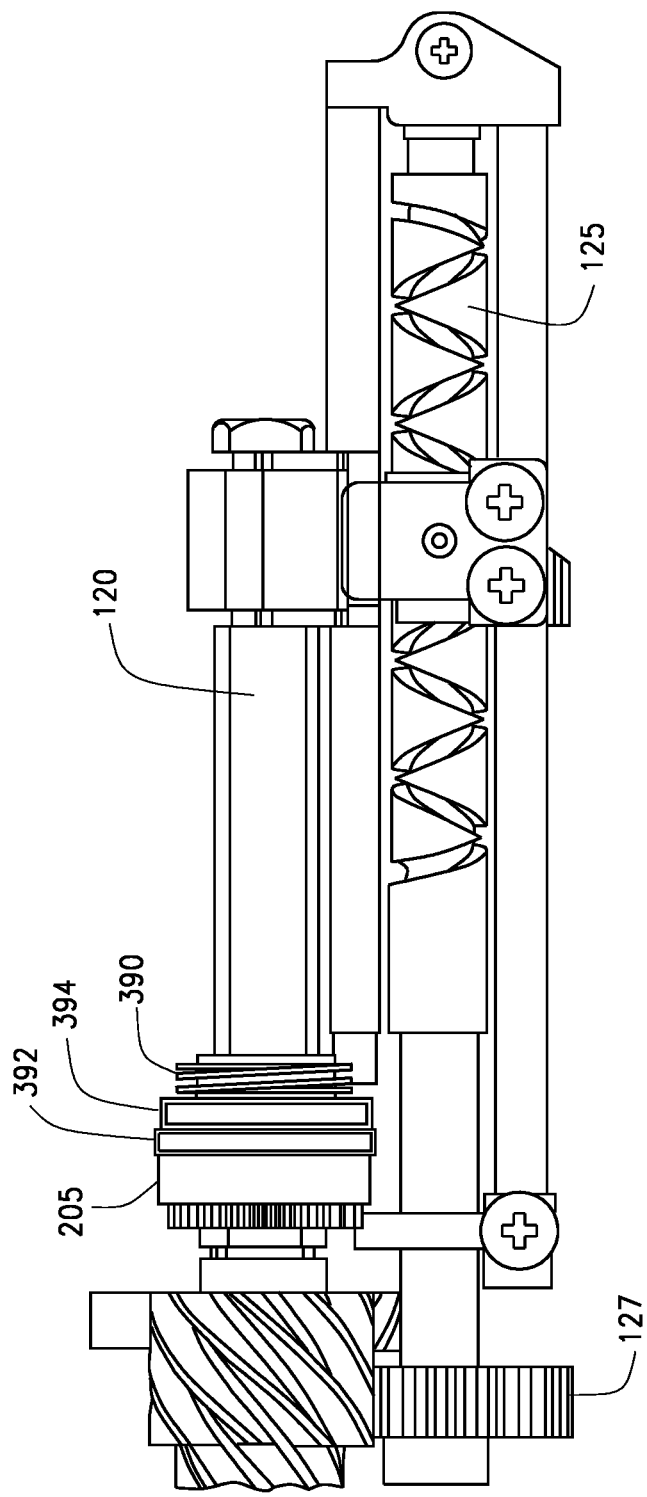
FIG. 7 is a partial side elevational view of still a further embodiment of the present invention where a constant axial drag force is applied in a direction parallel to the longitudinal axis of the mainshaft of the reel.

FIG. 7 illustrates still another embodiment where a constant axial force is being exerted against collar member 205 in a direction parallel to the longitudinal axis of the mainshaft 120. In this particular embodiment, the drag wheel 375 and lever member 380 have been eliminated and the biasing member 390 is held in position and captured by the body or housing of the reel (not shown). In this particular embodiment, the force applied by the washers 392 and 394 via biasing member 390 against the outer surface of collar member 205 is set at the factory and is a constant axial force. There is no adjustment mechanism associated with this particular embodiment such that the frictional force applied to the collar member 205 remains constant and a user would operate the reel with the factory set drag setting, simplifying the user experience by having no adjustment means. It is recognized that the drag mechanism of FIG. 7 could also be used in conjunction with the main drag assembly 105 as shown in FIG. 2 and in conjunction with the main drag lever 130, the latch 210 and its associated linkage 230, and biasing structure 235, as previously explained.

Although FIGS. 6 and 7 illustrate several embodiments of applying an axial force to collar member 205 in a direction parallel to the longitudinal axis of the mainshaft 120 of the fishing reel, it is recognized and anticipated that still other mechanisms can be used to apply an axial force to collar member 205 including using a drag wheel which includes a cam track similar to cam track 340 on at least one side of such a drag wheel and a lever component such as lever component 345 having a follower arm such as follower arm 350 and associated follower pin 365 that follows the cam track for moving the lever member 380 in a fore or aft movement so as to increase or decrease the amount of force applied to collar member 205. Still other arrangements for generating an axial force applied to collar 205 are likewise envisioned.

Among other things, it should be appreciated that the scope of the present disclosure is not limited to the number of constituting components, the materials thereof, the shapes thereof, the relative arrangement thereof, etc., as described above, but rather the above disclosures are simply provided as example embodiments. Further, any statements provided regarding features which may provide improved safety are not intended to guarantee, warrant or represent the safety of the platform support and integration assemblies or platform systems disclosed herein.

Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. A drag assembly for a spinning fishing reel, said spinning fishing real including a mainshaft and a housing, said housing including a front and a rear, said mainshaft being configured for rotational and longitudinal movement along an axis extending from front to rear of the housing, said longitudinal movement being driven by an oscillation system within the housing, the drag assembly comprising:
   a collar engaged with the mainshaft of the reel, said collar being fixed to the mainshaft for rotational movement with the mainshaft, but being fixed with respect to the housing against longitudinal movement with the mainshaft, said mainshaft thereby being free to oscillate longitudinally through the collar, and said collar being located in front of said oscillation system;
   a brake for engagement with the collar, said brake having a brake surface, wherein said brake surface makes selective contact with the collar to create a frictional force against rotation of the collar, and thereby against rotation of the mainshaft.

2. The drag assembly of claim 1 further including an adjustment mechanism engaged with the brake, said adjustment mechanism applying more or less force to the brake to create greater or lesser frictional force between the brake surface and the collar.

3. The drag assembly of claim 2 wherein the adjustment mechanism includes a wheel.

4. The drag assembly of claim 3 wherein the wheel acts on a lever to apply more or less pressure onto the brake as the wheel is rotated.

5. The drag assembly of claim 1 wherein the collar includes one or more teeth.

6. The drag assembly of claim 5 including a main drag assembly positioned in front of the collar, the main drag assembly being selectively adjustable to apply a frictional force against rotation of the mainshaft, and a latch coupled to a lever for selectively moving the latch into and out of engagement with the teeth of the collar to selectively engage or disengage the main drag assembly by preventing or allowing rotation of the collar, thereby preventing or allowing rotation of the mainshaft.

7. The drag assembly of claim 1 wherein a rod extends from the brake.

8. The drag assembly of claim 7 wherein a biasing mechanism is engaged with the rod.

9. The drag assembly of claim 1 wherein force applied by the brake to the collar is perpendicular to the axis of the collar and mainshaft.

10. The drag assembly of claim 9 wherein the perpendicular force applied to the collar by the brake is not transferred to the mainshaft, but frictional force created thereby is felt at the mainshaft.

11. The drag assembly of claim 1 wherein force applied by the brake to the collar is parallel to the axis of the collar and mainshaft.

12. The drag assembly of claim 11 wherein the brake includes one or more washers located adjacent to the collar and the brake surface includes at least one of said one or more washers.

13. A spinning reel having a spool for holding fishing line, a mainshaft and a housing, the housing having a front portion and a rear portion, the mainshaft extending through the spool and into the housing and being configured for rotational and longitudinal movement along an axis extending from the front portion to the rear portion of the housing, the longitudinal movement being driven by an oscillation system within the housing, the spinning reel further comprising:
   a main drag assembly positioned towards the front portion of the housing for applying a frictional force against the mainshaft, the mainshaft extending at least partially through the main drag assembly;
   a secondary drag assembly including a collar engaged with the mainshaft, said collar being fixed to the mainshaft for rotational movement with the mainshaft and being fixed with respect to the housing for preventing longitudinal movement with the mainshaft, said mainshaft being free to oscillate longitudinally through the collar, said collar being located in front of said oscillation system;
   a brake for engagement with the collar, said brake having a brake surface, said brake surface making selective contact with the collar to create a frictional force against rotation of the collar and thereby against rotation of the mainshaft;
   a latch coupled to a lever for selectively moving the latch between a first position wherein the latch is engaged with the collar so as to prevent the collar from rotating thereby preventing the mainshaft from rotating, and a second position wherein the latch is not engaged with the collar thereby allowing the collar and the mainshaft to freely rotate;
   movement of the lever so as to selectively position said latch in its first position or in its second position controlling which drag assembly is controlling rotation of the mainshaft.

14. The spinning fishing reel of claim 13 including an adjustment mechanism engaged with the brake, said adjustment mechanism applying more or less force to the brake to create greater or lesser frictional force between the brake surface and the collar.

15. The spinning fishing reel of claim 14 wherein said adjustment mechanism includes a wheel, rotation of said wheel supplying more or less pressure onto the brake to create more or less frictional force between the brake surface and the collar.

16. The spinning fishing reel of claim 15 wherein said adjustment mechanism further includes a biasing mechanism for applying more or less force to the brake to create greater or lesser frictional force between the brake surface and the collar.

17. The spinning fishing reel of claim 13 wherein the force applied by the brake to the collar is perpendicular to the axis of the collar and the mainshaft.

18. The spinning fishing reel of claim 13 wherein the force applied by the brake to the collar is parallel to the axis of the collar and the mainshaft.

19. The spinning fishing reel of claim 13 wherein movement of the lever to position said latch in its first position prevents the collar and the mainshaft from rotating thereby engaging the main drag assembly for controlling rotation of the mainshaft.

20. The spinning fishing reel of claim 13 wherein movement of the lever to position the latch in its second position disengages the main drag assembly by allowing said collar and said mainshaft to freely rotate thereby allowing the secondary drag assembly to control rotation of the mainshaft.

\* \* \* \* \*

UNITED STATES PATENT AND TRADEMARK OFFICE
CERTIFICATE OF CORRECTION

PATENT NO. : 10,881,091 B2
APPLICATION NO. : 16/130180
DATED : January 5, 2021
INVENTOR(S) : Cameron Ivie and Chandler Whisnant Page 1 of 1

It is certified that error appears in the above-identified patent and that said Letters Patent is hereby corrected as shown below:

In the Specification

In Column 4, Line 43, delete "aim" and replace with -- arm --

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*